United States Patent [19]

Raque

[11] 3,908,584
[45] Sept. 30, 1975

[54] PIZZA TOPPING MACHINE
[75] Inventor: Robert G. Raque, Louisville, Ky.
[73] Assignee: FMC Corporation, San Jose, Calif.
[22] Filed: Feb. 6, 1974
[21] Appl. No.: 440,107

[52] U.S. Cl. .......................... 118/2; 118/6; 118/16; 118/25
[51] Int. Cl.² ...................... B05C 5/00; B05C 13/00
[58] Field of Search .......... 99/450.6, 450.7; 118/25, 118/16, 6, 2, 308, 410, 411; 141/180, 256; 222/239, 240, 242, 411

[56] References Cited
UNITED STATES PATENTS

| | | | |
|---|---|---|---|
| 635,275 | 10/1899 | Cassidy | 222/239 |
| 2,869,592 | 1/1959 | Krueger | 141/180 X |
| 2,917,272 | 12/1959 | Kollman et al. | 118/25 X |
| 3,072,095 | 1/1963 | Keessen et al. | 118/6 |
| 3,164,490 | 1/1965 | Evanson et al. | 118/25 |
| 3,319,603 | 5/1967 | Hesselmann | 118/410 |
| 3,419,934 | 1/1969 | Lovett | 118/410 X |
| 3,685,744 | 8/1972 | Ludy, Jr. | 118/25 X |

*Primary Examiner*—John P. McIntosh
*Attorney, Agent, or Firm*—C. E. Tripp; R. B. Catto

[57] ABSTRACT

A machine for dispensing a flowable topping material onto a series of continuously moving circular pizza dough shells, and for adding other topping materials at one or more downstream dispensing stations. A power driven dispensing valve is mounted over the conveying path of the pizza dough shells, and applies a circular pattern of tomato paste sauce onto each passing shell. A speedup conveyor assumes support of the shells to space them apart, and each shell is then momentarily interrupted under a hopper at each of two stations where a topping material such as ground meat, grated cheese or other foodstuffs are applied. With this arrangement, the discharge rate of completed pizzas is the same rate with which the tomato paste sauce is applied.

7 Claims, 10 Drawing Figures

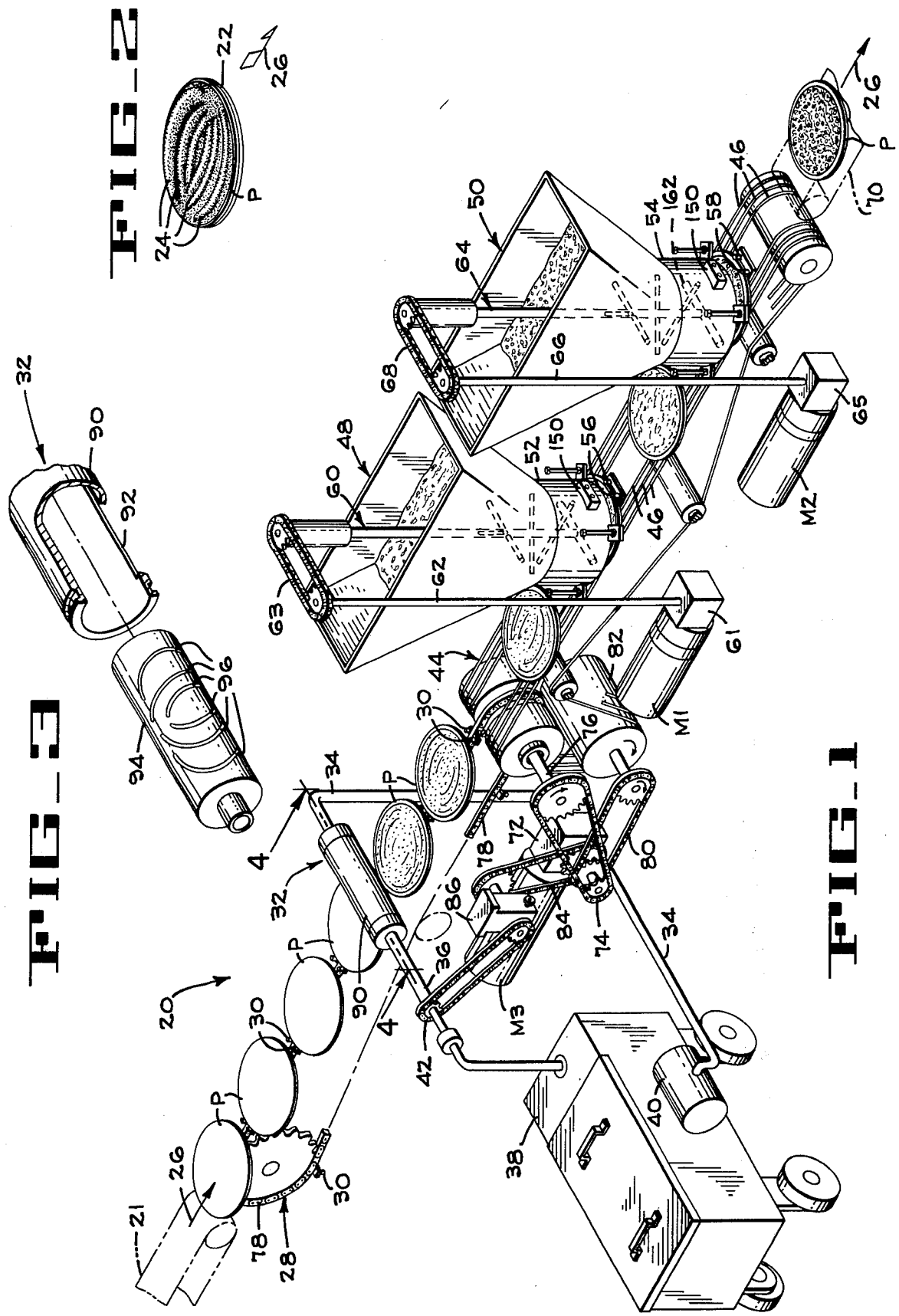

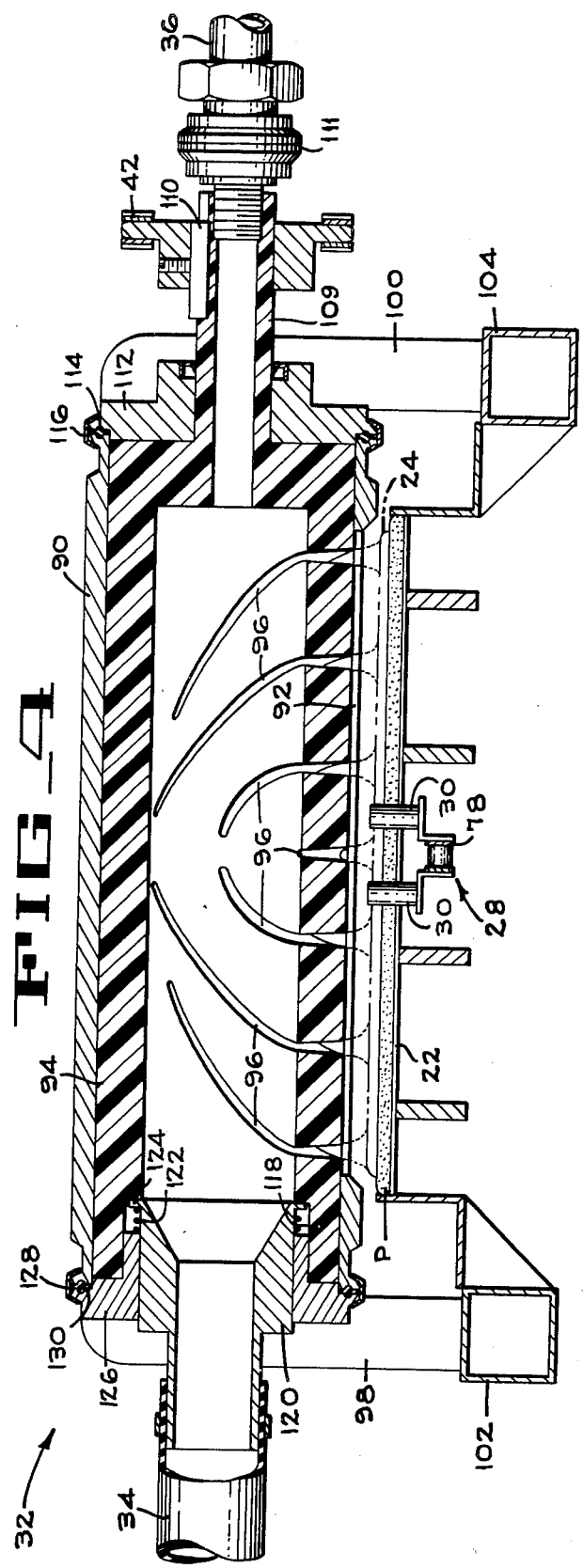
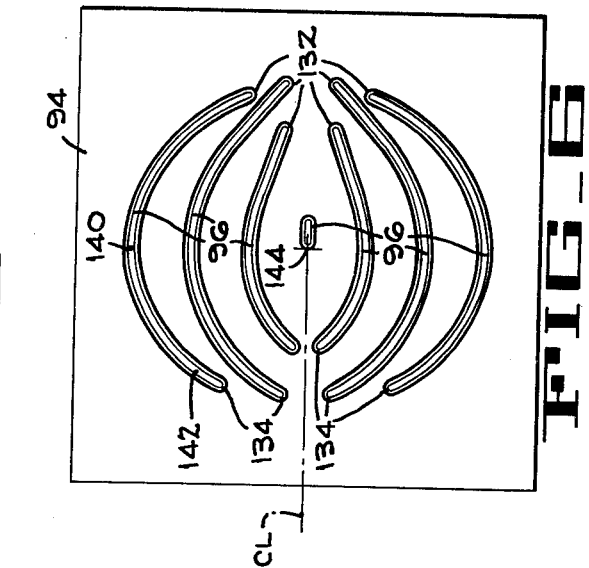
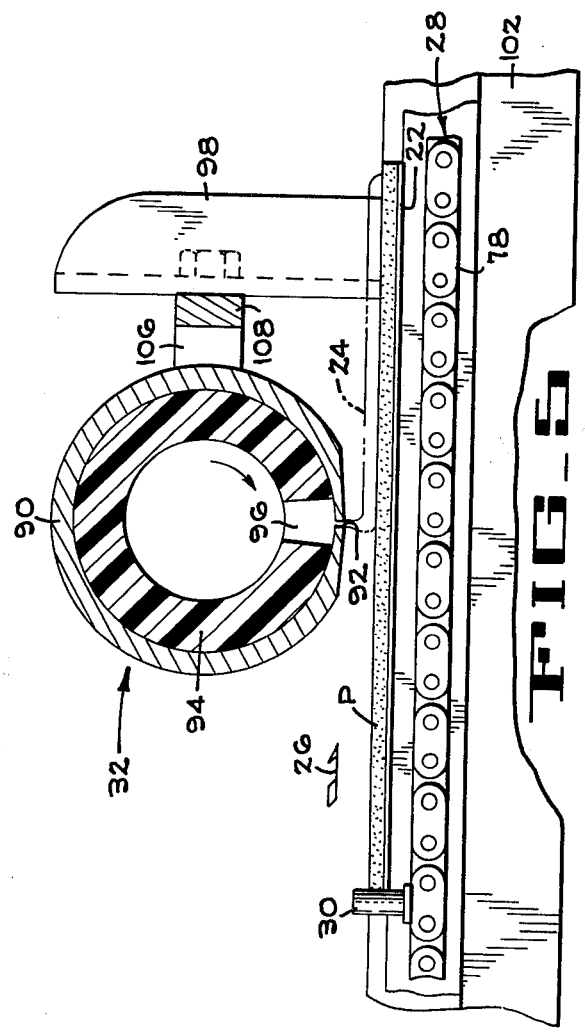

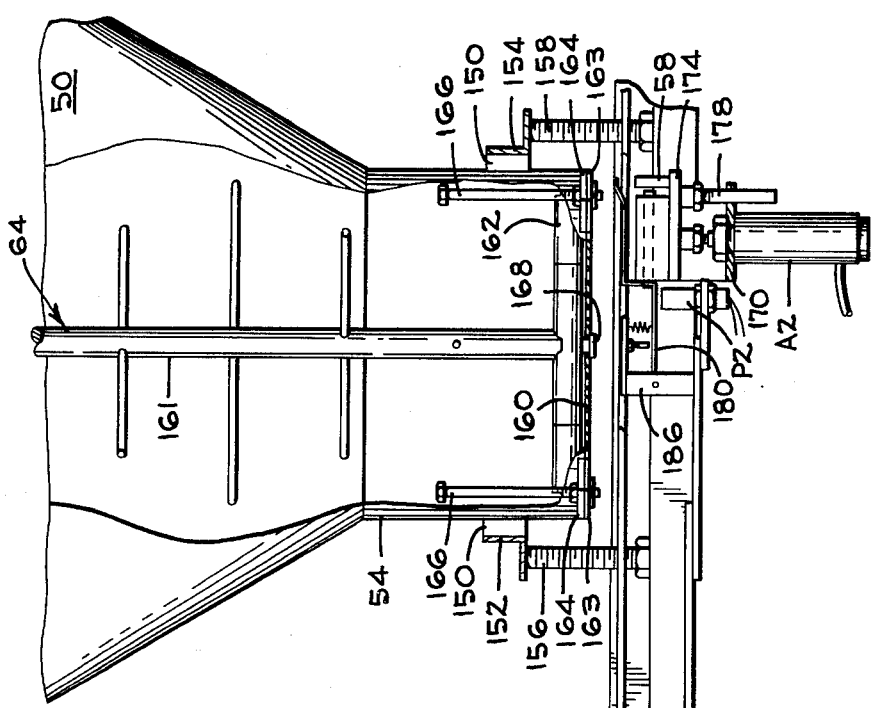
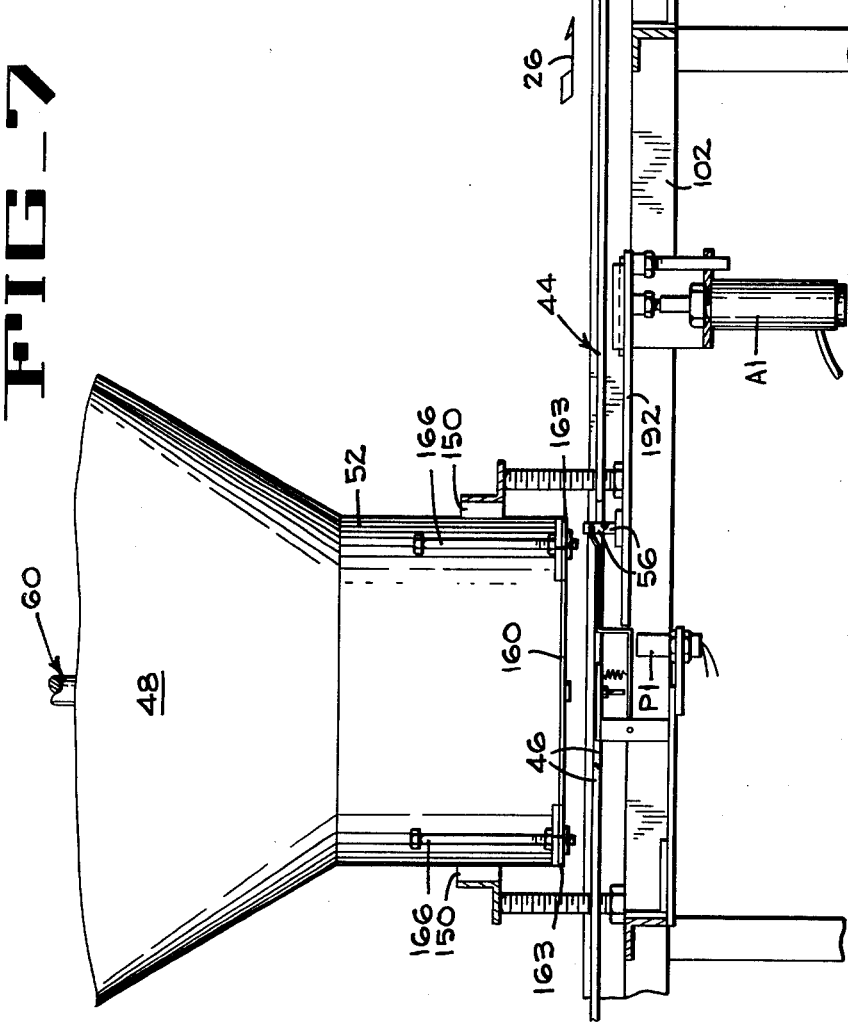
FIG. 7

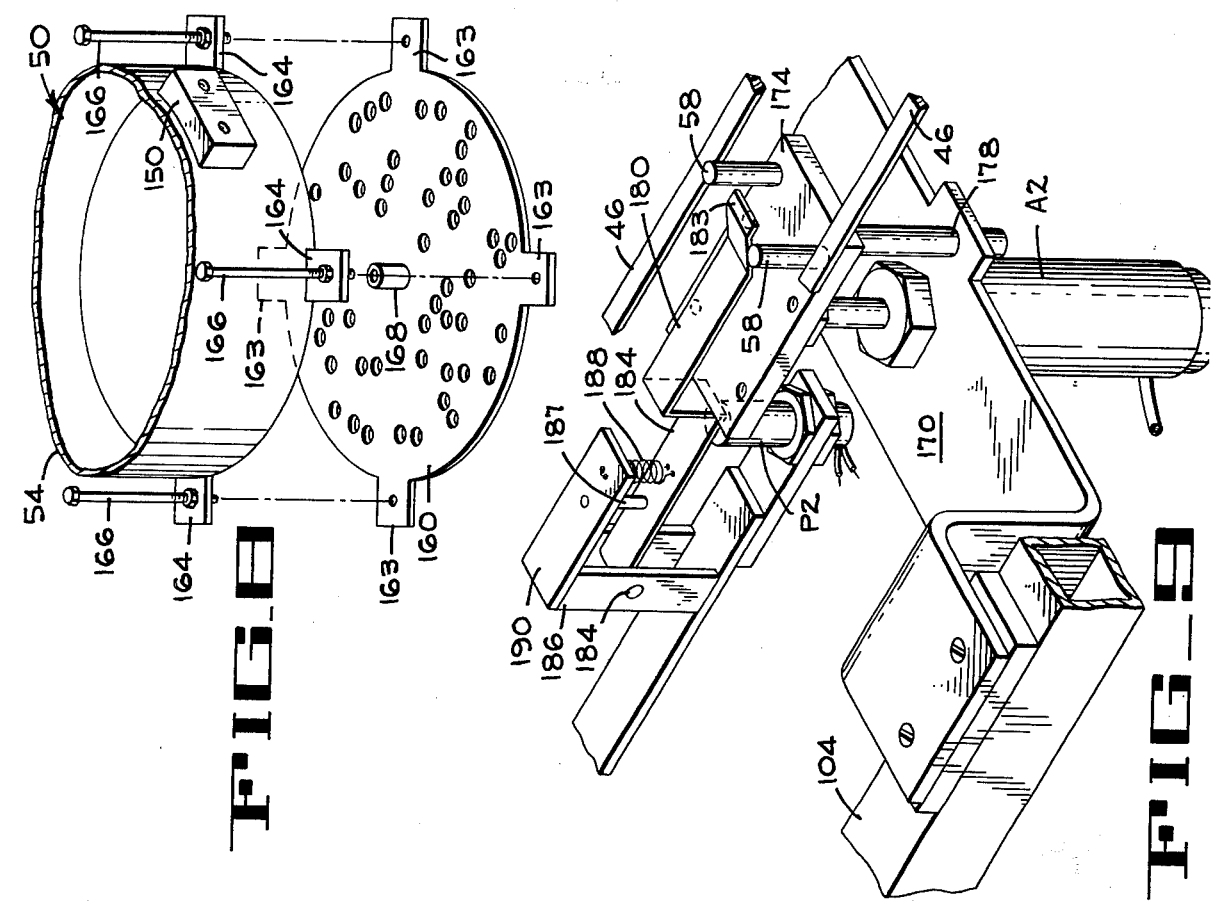
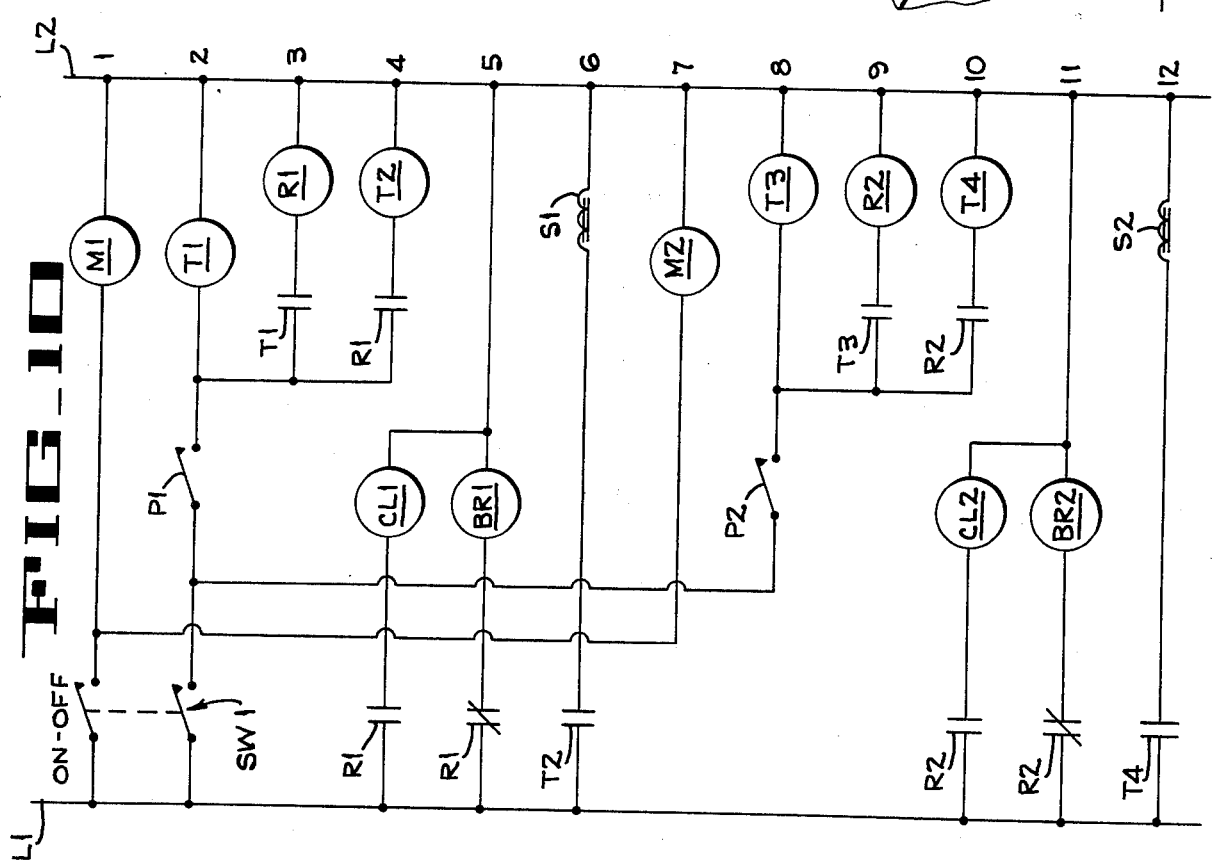

PIZZA TOPPING MACHINE

BACKGROUND OF THE INVENTION

The field of the present invention concerns food processing machinery of the general type for depositing a topping material onto an edible base, such as tomato paste sauce, plus ground meat, grated cheese and the like onto a pizza dough shell.

One example of a processing machine directed to the same general end result as the present pizza topping machine is disclosed in U.S. Pat. No. 3,648,596, issued Mar. 14, 1972, wherein a series of pizza shells are continuously conveyed under a curtain of topping material falling from a vibrating shaker platform. The topping material which is not intercepted by a pizza shell is collected and recirculated with fresh topping material. While there is an advantage afforded by the continuous mode of operation, the machine is limited to topping materials which can be combined and deposited by shaker control in a single application. This necessarily limits the topping material to a somewhat dry and granular form, and excludes, for example, a tomato paste of low viscosity, plus ground cheese and ground meat because these ingredients, combined, will resist vibratory shaker control.

A specific problem of the present invention is to sequentially apply, at the production rates presently acceptable in the food processing industry, a liquid or flowable tomato paste sauce in a circular pattern onto a moving, circular pizza dough shell, and to then individually apply other topping materials such as ground meat and grated cheese. Another aspect of the problem is to carry out the foregoing steps with no spillage by applying a circular pattern of topping material which will all be deposited on the pizza dough shell, and will thus require no recovery and redistribution system for spilled product.

The prior art discloses dispensing valves for applying a circular pattern of flowable material to an edible substrate. For example, U.S. Pat. No. 2,855,891 shows a dispensing valve structure, for putting icing on bakery cakes, in which an outer casing containing icing under pressure is provided with rows of vending ports. A rotatably oscillating inner valve element opens and shuts the vending ports at different times so that the resulting pattern of ejected icing approximates the circular form of the cake. In order to open and close the ports at different times, the valve element is in the form of a cylinder cut away on opposite sides to present an hour-glass profile, and is reciprocated to rotate one curved face of the valve element across the ports. Since the curved face varies in width due to the hour-glass profile, the ports are opened and closed along the length of the valve and produce a circular pattern of deposited icing. This construction requires a valve casing of rectangular cross-section and a valve core somewhat more complex than a simple cylinder, both of which contribute to an inordinately expensive construction if the valve is to be constructed of stainless steel, an approved material for food handling.

SUMMARY OF THE INVENTION

A motor driven dispensing valve is provided with a hollow rotor having an apertured wall comprising arcuate slots generally normal to the axis of rotation, and with a fixed outer casing having a longitudinal, narrow dispensing slot along its underside. A flowable topping material is fed into the rotor to be dispensed along the length of the dispensing slot as the arcuate slots move across the latter, and the collective beads of topping material deposited on a continuously moving pizza dough shell beneath the valve approximate the circular form of the shell. It has been found that laying the beads of topping material along curvilinear paths generally aligned with the direction of movement of the pizza dough shell results in more effective distribution of the material and more readily controlled application than in the case of linear beads. Further, it has been experimentally proven that these improved results, with the particular valve structure to be disclosed, cannot be had with linear slots in the valve rotor, nor with circular apertures forming a pattern approximating either linear or curvilinear rotor slots.

According to another aspect of the present invention, continuous production is achieved at the same rate the topping material is applied, even though the movement of the pizza dough shells is interrupted at two dispensing stations downstream of the topping station. For this purpose, the pizza dough shells, after the tomato paste sauce is applied, are accelerated to increase their spacing, and are momentarily arrested at each dispensing station long enough to apply, for example, ground meat and grated cheese, and are then released for discharge at a rate substantially restoring their initial spacing.

BRIEF DESCRIPTION OF THE DRAWINGS

FIG. 1 is a schematic isometric of the overall pizza topping machine of the present invention.

FIG. 2 is an isometric of a pizza shell with the tomato paste sauce applied but not yet settled.

FIG. 3 is a fragmentary isometric of a topping dispensing valve utilized in the FIG. 1 apparatus.

FIG. 4 is a longitudinal section through the topping dispensing valve, taken along line 4—4 of FIG. 1.

FIG. 5 is a transverse section through the valve shown in FIG. 4.

FIG. 6 is a developed pattern of the slots in the internal rotor of the valve shown in FIG. 4.

FIG. 7 is an enlarged longitudinal section, partly broken away, of the two dispensing hoppers shown in FIG. 1.

FIG. 8 is an enlarged isometric of the bottom portion of one of the hoppers shown in FIG. 7, with the bottom of the hopper detached.

FIG. 9 is an enlarged isometric of a sensing switch mechanism which is associated with the hopper shown in FIG. 7 at the right side of the drawing.

FIG. 10 is a schematic control diagram of certain electrical components for controlling the pizza topping machine of the present invention.

DESCRIPTION OF THE PREFERRED EMBODIMENT

With reference to FIGS. 1 and 2, and the general organization and functions of the overall pizza topping machine 20, each pizza dough shell P (FIG. 2) is fed to the machine by a delivery conveyor 21 (FIG. 1) already supported on a flat disc of cardboard 22. During movement of the shell P through the machine, the shell is initially covered with a flowable topping material, such as tomato sauce paste. At two subsequent stations, other ingredients are added, such as ground meat and grated cheese, either or both of which may also have other entrained ingredients and condiments. The tomato paste sauce is applied in the form of arcuate beads 24, which are in general alignment with the direction of movement, indicated by the arrow 26, of the pizza shells P.

In brief outline, to carry out the above outlined functions, the pizza topping machine 20 transports the pizza dough shells P on an input conveyor 28, having a spaced series of pusher lugs 30, past an overhead topping valve 32. The valve 32 is hollow, with axial inlet and outlet conduits 34 and 36, respectively, that circulate a flowable topping material, such as tomato paste, in a closed loop including a portable heated reservoir 38, and a circulating pump 40. As later described, the valve 32 is provided with an inner rotor or core that is driven by a chain and sprocket drive train 42 to controllably dispense the tomato paste from the valve in a circular pattern onto each passing pizza shell P with no spillage or waste. Thus, the beads 24 of tomato paste collectively form a circular pattern just slightly smaller than the pizza shell, and the beads settle to merge together and cover substantially the entire surface of the shell.

Aligned with the input conveyor 28 is a transport conveyor 44 formed of multiple flights of narrow belts 46 which extend under and past dispensing hoppers 48 and 50. The hopper 48 has a cylindrical discharge throat 52 and is adapted to dispense a circular pattern of partially cooked, ground granulated meat, for example. The hopper 50 is provided with a circular discharge throat 54 and is arranged to dispense a circular pattern of grated cheese or other granular material onto the meat and tomato paste previously applied.

In order to dispense predetermined amounts of condiments from the hoppers 48 and 50, each pizza shell is arranged to be temporarily stopped in vertical alignment with the discharge throats 52 and 54 by pairs of vertically erectable stop pins 56 and 58. Thus, a pizza shell approaching the hopper 48 is sensed by a proximity switch (later described) adjacent the pins 56 so that the pins are raised in the path of the shell and it is arrested in vertical coincidence with the discharge throat 52 while the transport conveyor 44 continues to operate.

During the time the topping materials are applied to the shell P from the hopper 48, a control circuit energizes a motor M1 which drives an agitator unit 60 extending downward through the hopper 48 into the throat 52. The drive train between the motor M1 and the agitator unit 60 includes a gear box 61, a driven shaft 62, and a chain and sprocket drive unit 63 coupled to the driven shaft and to the agitator unit. The agitator 60 stirs the condiment over a perforate bottom wall in the throat 52 for a predetermined time interval which will result in the desired thickness of topping applied to the pizza shell. In the same way, a motor M2 associated with the hopper 50 operates an agitator unit 64 driven by a gear box 65, a driven shaft 66, and a chain and sprocket drive train 68 to dispense condiment from the throat 54 for a predetermined time onto the pizza shell, following which the transport conveyor 44 resumes operation to eject the pizza onto a discharge conveyor 70 for processing by associated apparatus, such as packaging and freezing machines.

With more specific reference to the structural details and features of the pizza topping machine 20, a main drive motor M3 powers a gear box 72, the output shaft of which is connected by a chain and sprocket drive train 74 to a drive shaft 76 for the input conveyor chain 78. A second chain and sprocket drive train 80 is coupled to the gear box 72 and to a drive roller 82 which is engaged with the narrow belts 46 comprising the conveying surface of the transport conveyor 44. In order to drive the topping valve 32 in timed relation to the conveyors 28 and 44, the gear box 72, by means of a chain and sprocket drive train 84, powers a gear box 86 which is coupled to the previously mentioned topping valve drive train 42.

The topping valve 32 (FIGS. 3—5) includes a fixed tubular outer shell 90 having a longitudinal slot 92 along its bottom sector. A driven cylindrical rotor 94 is mounted for rotation within the shell 90 and is internally supplied with tomato paste under pressure through the conduit 34 (FIG. 1). The paste is delivered from the rotor 94 to the dispensing slot 92 by means of an apertured wall comprising a plurality of circumferentially arcuate slots 96 which periodically communicate with the dispensing slot 92. Accordingly, the pressurized tomato paste is forced through the slots 96 to be ejected from the dispensing slot 92, in the outer tube 90, at continuously varying points along the length of the dispensing slot. As shown in FIG. 6, which shows the rotor 94 in developed form, the pattern of the slots 96 approximates a circle, so arranged that the beads 24 (FIG. 2) of tomato paste fall within the perimeter of the pizza shell P.

As best shown in FIG. 4, the topping valve 32 is supported by means including upright standards 98 and 100 which are respectively supported on fixed, transversely spaced, frame tubes 102 and 104. The outer tube 90 (FIG. 5) of the topping valve 32 is provided with laterally projecting lugs 106 (only one of which is shown) which are bolted to a transversely extending bar 108 that spans the upright standards 98 and 100. Thus supported, the topping valve 32 has its lower dispensing slot 92 closely spaced above the upper surface of the pizza shell P.

The rotor 94 is in close sliding engagement with the interior surface of the tube 90 and is driven in a clockwise direction, as shown in FIG. 5, by means of an integral outwardly projecting neck 109 (FIG. 4) which is secured by a key 110 to the chain and sprocket drive train 42. The outer end of the neck 109 is interiorly threaded and mounts the rotatable half of a swivel joint 111 which allows free rotation of the rotor 94 relative to the outlet conduit 36. The adjacent end of the tube 90 is sealed by a cap 112, both the tube and cap having cooperative radially projecting flanges that are sealed at their interface by a seal ring 114 and that are axially locked together by an external clamp ring 116.

At its other end, the rotor 94 has a counterboard portion 118 for the reception of a non-rotatable connector 120 which is coupled to the inlet conduit 34. A compression spring 122 is mounted between an end flange 124 of the connector 120 and the inner end surface of a capping plug 126 that is coupled to the tube 90, by a clamping ring 128, and sealed at its interface with the tube by a sealing ring 130. The flange 124 provides a dynamic seal, energized by the spring 122, against the bottom of the counterbore 118.

FIG. 4 is taken in a direction looking downstream, with the bottom of the rotor 94 moving toward the viewer. Correlating this movement to FIG. 6, the leading ends of the slots 96 are indicated at 132, and the developed rotor is viewed from the outside. It will be noted that the slots 96 taper inward from said outer side, but there is no functional significance to this taper; it merely results from the shape of the cutter used to form the slots. A suitable material for the rotor is the plastic marketed under the trademark DELRIN since it is easily maintained to the necessary sanitary requirements of the food processing industry, is relatively inexpensive, is readily machined, and has a low coefficient of friction.

The pattern of slots 96 (FIG. 6) was developed by trial and error, and while the pattern does not seem to be capable of being mathematically defined, it should be noted that the pattern shown has certain significant features, and that some types of patterns which were tried were far less efficient than the present pattern and slot shapes. For example, it was found that a generally circular pattern of straight slots parallel to the direction of movement of the pizza shells was not satisfactory. Similarly, a generally circular pattern of round holes did not function as well as the arcuate slots 96 and their pattern arrangement.

It will be noted that the leading ends 132 of the slots 96 are laterally spaced from the centerline CL differently than are the trailing ends 134 of the slots. No conclusive reason is known for the fact, but it was found that the leading ends of both of the inner and outer pairs of arcuate slots should desirably be closer together than the trailing ends of the same slots. Thus, considering the functional effect of the slot interspacing, with the directional rotation of the rotor advancing the lower sector of the rotor upstream as shown in FIG. 5, it has been found that it is desirable to dispense a higher concentration of tomato paste near the centerline at the leading end of the pizza shell, than at the corresponding area at the trailing end of the shell.

The generally circular pattern of slots 96 (FIG. 6) approximates an ellipse with the minor axis thereof extending along the centerline CL. The reason for this is that the valve rotor 94 and the pizza shells P are respectively driven and conveyed at constant speed, and successive points along each arcuate slot registering with the linear dispensing slot 92 thus cause the tomato paste to be issued from the dispensing slot with a varying instantaneous velocity along the dispensing slot and across the pizza shell. In other words, considering the points at 140 and 142 of the uppermost slot in FIG. 6, the tomato paste delivered as the groove between the points 140 and 142 indexes with the dispensing slot 92 (FIG. 5) moves rapidly inward from the point 140. However, the paste has a viscous consistency and will thus lag behind as the delivery point moves along the dispensing slot 92, and foreshortening the groove pattern in the direction of movement of the pizza shell actually produces a near circular pattern of tomato paste sauce on the pizza shell. This delivery lag of the tomato paste sauce necessitates the similar configuration for the leading ends 132 of the slots 96, except that these portions are slightly further from the center at 144 than are the trailing ends 134, so that the delivery lag of the tomato paste will place the paste within the circular profile of the pizza dough shell.

It will be seen that to obtain consistent results, the tomato paste must be within a predictable viscosity range, and that the delivery pressure of the paste into the rotor 94 must be correlated to the size and number of the arcuate slots 96. For this purpose, and further to assure that the paste cannot stagnate or congeal within the circulation loop including the dispensing valve 32, the paste is heated within the reservoir 38, and is pressurized by the pump 40. Both the temperature and pressure are maintained within predetermined ranges by conventional means, not shown, whereby the flow characteristics of the tomato paste are uniform, and known.

Both dispensing hoppers 48 and 50 (FIG. 7) are of similar construction, and a description of the hopper 50 will suffice for both hoppers. The discharge throat 54 of the hopper 50 is provided with fixed mounting lugs 150 that are secured to transverse angle bars 152 and 154. In turn, the angle bars are mounted upon fixed posts 156 and 158 on the frame tube 102, and upon similar posts, not shown, that project upward from the other frame tube 104 (FIG. 4). The posts are vertically adjustable to provide a selected clearance between the hopper and the pizza shell.

Removably secured across the bottom end of the discharge throat 54 is a perforate metering plate 160, the apertures of which, in number and size, are such as to dispense the desired amount of topping material according to the rotational speed of the agitator 680 and the timed period during which the agitator is moving. To stir the topping material across the metering plate, the agitator includes a vertical shaft 161 (coupled to the chain and sprocket drive train 68 in FIG. 1) which turns a lower stirring rod 162 closely spaced above the metering plate.

The metering plate 160 is provided with four integral mounting lugs 163 (FIG. 8) that are secured to corresponding lugs 164 on the discharge throat 54 by bolts 166 which are readily removed to take off the metering plate for cleaning the hopper. A central pilot shaft 168 in the metering plate extends into a recess in the agitator shaft 161 to provide a turning center for the shaft.

The operating mechanism for the stop pins 58 (FIG. 7) which momentarily arrest a pizza dough shell in vertical alignment with the metering plate 160 is best shown in FIG. 9, and is similar to the mechanism for the stop pins 56, except as later pointed out. A mounting strap 170 is connected to the frame tube 104 and the frame tube 102 (not shown) to centrally support an electrically controlled air cylinder A2. A plate 174 is mounted across the end of the piston rod of the air cylinder and carries the two stop pins 58 for blocking the conveying movement of a pizza dough shell when the air cylinder is energized to project its piston rod upward. An internal spring keeps the piston rod normally retracted. To prevent rotation of the plate 174, a depending guide pin 178 is arranged to slide up and down in an aperture in the mounting strap 170.

Extending over the plate 174 is a depressible actuator 180 for a proximity switch P2 which alters an electrical circuit when a pizza dough shell depresses the downstream end portion 183 of the actuator 180, and moves an arm 184 thereof proximate the switch P2. Thus, the actuator 180 is pivoted by a pin 184 to a fixed bracket 186, and is biased upward against a stop pin 187 by a tension spring 188 between an overhead arm 190 and the arm 184. When the leading end of the cardboard disc 22 supporting the pizza dough shell depresses the actuator end portion 183, the arm 184 closely overlies and is sensed by the proximity switch P2. This alters a control circuit to direct air into the air cylinder A2 and raise the stop pins 58 to arrest the pizza shell is vertical alignment with the metering plate 160.

In similar manner, a proximity switch P1 (FIG. 7) is associated with the other hopper 48, and an air cylinder A1 is arranged to raise the stop pins 56. Because of space limitations for structural parts not shown, the air cylinder A1 is positioned a substantial distance downstream from the proximity switch P1, and the stop pins 56 are mounted on an elongate strap 192 which is connected to the piston rod of the air cylinder. In all other respects, the mechanisms associated with the air cylinder A2 are the same as the similar parts described for the air cylinder A1.

The FIG. 10 control circuit includes power input lines L1 and L2 which energize the agitator drive motors M1 and M2 (lines 1 and 7) when a main switch SW1 is closed, and ready the other operating components. It is assumed that other controls, not shown, have been actuated to energize the main drive motor M3 (FIG. 1) and the pump 40, thus driving the input conveyor 28, the topping dispensing valve 32, the transport conveyor 44, and circulating heated tomato paste through the valve 32.

As the pizza dough shell P (FIG. 1) are advanced by the pusher lugs 30 past the valve 32, the shells are covered with sauce, and each shell in turn is arrested under the hoppers 48 and 50. Due to the velocity increase as the shells transfer from the input conveyor 28 to the transport conveyor 44, their interspacing becomes such that the combined time periods during which the shells are momentarily stopped under the hoppers still allows a discharge rate of finished pizza shells to the discharge conveyor 70 about the same as the rate at which the tomato sauce is applied.

As the leading, incoming pizza shell P approaches the stop pins 56, the proximity switch P1 (FIGS. 7 and 10) closes. This energizes a timer T1, line 2, having normally open contacts T1, line 3, in series with a control relay R1. The relay R1 has normally open contacts R1, line 4, in series with a clutch CL1 for the agitator unit 64 (FIG. 1) and normally closed contacts R1, line 5, in series with an associated electric brake BR1.

As soon as the proximity switch P1, line 2, closes, the timer T1 begins a timed delay period and the relay R1 is momentarily energized by the closed contacts T1, line 3, to reverse the position of the contacts R1 in lines 4 and 5. The clutch CL1 and brake BR1 are associated with the motor M1 (FIG. 1) which drives the agitator unit 60. Thus, with the conditions so far described, the clutch CL1 begins to drive the agitator unit. At this time, the pizza shell has already been arrested by the closure of the proximity switch P1, as next described.

At the same time the proximity switch P1 was closed to energize the relay R1 through the closed contacts T1 in line 3, the contacts R1, line 4, closed to energize a timer T2 to close normally open timer contacts T2, line 6, that energize a solenoid S1. The solenoid S1, when energized, directs air to the air cylinder A1 (FIG. 7) to raise the stop pins 56 and arrest the pizza dough shell for the (adjustable) timed period the timer T2 will maintain the contacts T1 in line 6 closed. Similarly, the agitator 60 is driven for the (adjustable) timed period the timer T1 maintains the contacts T1 in line 3 closed to energize the relay R1. Since the timer T1 governs the time during which the agitator dispenses topping material from the hopper 48, the timer T1 is preset to be deenergized just before the timer T2 deenergizes the solenoid S1 and allows the stop pins 56 to retract and release the pizza dough shell.

The control elements for the agitator unit 64 (FIG. 1) and the stop pins 58 duplicate the control elements above described. Accordingly, after the topping material from the hopper 48 has been deposited on the pizza dough shell, and the shell is carried by the transport conveyor 44 (FIG. 7) to the hopper 50, the proximity switch P2, line 8, is closed. A timer T3 is energized, thus closing timer contacts T3, line 9, to energize a relay R2. At the same time, the relay contacts R2, line 10, close to energize a timer T4, and timer contacts T4, line 12, close to energize a solenoid S2. The solenoid S2 directs air to the air cylinder A2 (FIG. 7) to raise the stop pins 58, and the relay contacts R2 in lines 10 and 11 respectively close and open to engage the clutch and release the brake of the motor M2 and start the agitator 64. After the preset time period controlled by the timer T3, the clutch CL2 is released and the brake BR2 is set to stop the agitator. The timer T4 when deenergizes the solenoid S2 to allow the stop pins 58 to lower, and the finished pizza with tomato sauce and two other topping materials is released to the discharge conveyor 70.

From the preceding description, it is believed evident that the pizza topping machine 20 is capable of rapid and reliable continuous production runs, with prolonged inattention because it does not require constant extensive cleaning as in those types of machines where excess topping material is applied and the residue is continuously collected (with attendant spillage) and recirculated.

Although the best mode contemplated for carrying out the present invention has been herein shown and described, it will be apparent that modification and variation may be made without departing from what is regarded to be the subject matter of the invention.

What is claimed is:

1. A pizza topping machine comprising:
    a. an input conveyor for continuously conveying a series of circular pizza dough shells along a linear path;
    b. a topping dispensing valve extending transversely above said path;
    c. said valve including a fixed cylindrical tube having a longitudinal dispensing slot along its bottom sector;
    d. a hollow cylindrical rotor within said tube having a pattern of circumferentially disposed, axially spaced curvilinear slots arranged to communicate the interior of said rotor with said dispensing slot, said slots having a developed pattern that lies within the confines of a circle;
    e. axial inlet and outlet conduits connected to said rotor;
    f. a circulation pump connected to said inlet conduit for supplying the flowable topping under pressure to the interior of said rotor;
    g. means for driving said rotor in timed relation with said input conveyor with the lower section of said rotor moving counter to the direction of movement of said pizza dough shells;
    h. a heated reservoir for the topping connected to said pump and to said outlet conduit to maintain the circulating topping material within a predictable temperature range, and hence, viscosity;
    i. a transport conveyor for receiving the pizza dough shells covered with the flowable topping;
    j. means for continuously driving said transport conveyor at a velocity exceeding the velocity of said inlet conveyor to increase the spacing between said shells;

k. a hopper mounted over said conveyor;

l. a circular perforate bottom wall on said hopper;

m. an agitator within said hopper;

n. means for sensing a shell approaching vertical alignment with said hopper;

o. a stop actuated by said sensing means to interrupt said shell in vertical alignment with said bottom wall; and p. means actuated by said sensor for driving said agitator for a predetermined time.

2. Apparatus according to claim 1 wherein said stop and sensing means includes:

a. an air cylinder having its piston rod vertically disposed under said hopper beneath the plane of said transport conveyor;

b. a proximity switch for actuating said air cylinder;

c. a depressible actuating arm overlying said proximity switch and arranged to be depressed by a shell approaching said position of vertical alignment with said hopper; and d. an abutment mounted on said piston rod for movement above the plane of said transport conveyor to arrest said shell while said transport conveyor is driven.

3. Apparatus according to claim 2 wherein:

a. said transport conveyor is driven at a velocity exceeding the velocity of said input conveyor; and b. timing means governing the actuation of said air cylinder for interrupting the pizza dough shell for a preselected time period during the time period said agitator is driven.

4. A pizza topping machine comprising:

a. an input conveyor for continuously conveying a series of circular pizza dough shells along a linear path;

b. a topping dispensing valve extending transversely above said path;

c. said valve including a fixed cylindrical tube having a longitudinal dispensing slot along its bottom sector;

d. a hollow cylindrical rotor within said tube having a pattern of circumferentially diposed, axially spaced curvilinear slots arranged to communicate the interior of said rotor with said dispensing slot;

e. said slots having a developed pattern that lies within the confines of a circle;

f. means for circulating a flowable topping under pressure axially through said rotor; and g. means for continuously rotating said rotor in one direction and in timed relation with said input conveyor.

5. Apparatus according to claim 4 wherein the developed pattern of said arcuate slots approximate an ellipse having a minor axis which is aligned with the conveying path of said dough shells.

6. Apparatus according to claim 4 wherein the slots in said rotor collectively have a developed pattern approximating an ellipse with the major axis aligned with the turning axis of said rotor.

7. Apparatus according to claim 6 wherein said rotor is driven in a direction moving its lower sector upstream relative to the direction of movement of said transport conveyor.

* * * * *

UNITED STATES PATENT OFFICE
CERTIFICATE OF CORRECTION

PATENT NO. : 3,908,584
DATED : September 30, 1975
INVENTOR(S) : ROBERT G. RAQUE

It is certified that error appears in the above-identified patent and that said Letters Patent are hereby corrected as shown below:

Column 1, line 11, "issured" should be --issued--.

Column 4, line 52, "counterboard" should be --counterbored--.

Column 5, line 25, delete "of" second occurrence.

Column 6, line 22, "680" should be --68--.

Column 6, line 66, "is" should be --in--.

Column 7, line 22, "shell" should be --shells--.

Column 8, line 18, "when" should be --then--.

Column 10, line 11, "diposed" should be --disposed--.

Signed and Sealed this

Third Day of August 1976

[SEAL]

Attest:

RUTH C. MASON
Attesting Officer

C. MARSHALL DANN
Commissioner of Patents and Trademarks